Patented Mar. 2, 1948

2,437,232

UNITED STATES PATENT OFFICE 2,437,232

STABILIZATION OF POLYESTERS FROM DI-HYDRIC ALCOHOLS AND BOTH SATURAT-ED AND UNSATURATED DICARBOXYLIC ACIDS

David A. Rothrock, Jr., and Richard F. Conyne, Philadelphia, Pa., assignors to The Resinous Products & Chemical Company, a corporation of Delaware No Drawing. Original application October 15, 1943, Serial No. 506,432. Divided and this application November 21, 1945, Serial No. 630,128

14 Claims. (Cl. 260—75)

This invention relates to new compositions of matter and to the process by which they are formed. More particularly, it relates to improvements in condensation polymers and to improvements in their stability.

This application is a division of application Serial No. 506,432, filed October 15, 1943.

It has long been known that when a dihydric alcohol or its functional derivatives and a dibasic carboxylic acid or a polyester-forming derivative thereof, such as an acid halide, a salt, or a simple ester of a dibasic acid and a volatile monohydric alcohol, are heated together polymeric esters result. These polyesters are linear condensates. As heating is continued, particularly in vacuo or in a current of an inert gas, condensation continues linearly with formation of longer and longer chains. The products thus obtained vary from gummy products through waxy to hard or crystalline products, depending upon choice of reactants and conditions of reaction. At high molecular weights, some of the linear condensation polymers are capable of being cold-drawn into fibers. But not all applications of these polyesters are dependent upon this property. The polyesters are useful for a great variety of other purposes, such as coating, adhering, extruding, molding, casting, laminating, or modifying other resinous or polymeric materials, including synthetic rubbers. The intended use generally determines the choice of dibasic acid and of dihydric alcohol and the extent to which the condensation polymerization of the polyester is carried. For many purposes polymers having molecular weights of at least five thousand are desired and, in many applications, polyesters having molecular weights of eight thousand, or twelve thousand, or even more are particularly valuable. In general, with high molecular weight it becomes more difficult to maintain the properties which are dependent upon such molecular weight.

In applying polyesters, there are many advantages in using them in the molten form. In air and/or moisture, however, the molten polyesters degrade as heating is continued. The changes appear to be due to both oxidation and hydrolysis, but, according to at least one theory of this degradation, oxidation of reactive groups supplies water for splitting the ester linkages. Similar degradation of the polyesters occurs on aging, particularly in light. Whatever the mechanism of degradation, the degraded polyesters are less useful than the original polyesters, and the degraded material often fails for its intended purposes.

On the other hand, some polyesters are unstable in another way. If the hot melted products are maintained under an inert atmosphere to avoid degradation during application, they may tend to become more viscous. This may so alter the properties as to interfere with the proper extruding, coating, or applying of the polyester. While acylation of the terminal hydroxyl groups of a linear polyester may be used to inhibit an increase in viscosity of melted polymer, this reaction does not assure stabilization in other respects.

The primary objects of this invention are to provide a method for stabilizing polyesters of high molecular weight and to provide polyesters stabilized against changes due to continued polymerization or to degradation. It is also an object to provide new polymeric compositions which are capable of being extruded, coated, molded, or otherwise shaped or applied from "hot melts" and which retain the desired degree of viscosity, plasticity, toughness, and other properties during and after the application thereof. It is thus an object to stabilize polyesters based on dibasic acids and dihydric alcohols, particularly those of high molecular weight. It is a particular object to lessen markedly the degradation from air, light, and moisture of highly polymerized esters derived from such acids and alcohols.

We have found that these objects are accomplished by preparing a polymeric condensate of a dibasic carboxylic acid and a dihydric alcohol, carrying the linear condensation thereof to an intermediate stage or approximately to the degree of condensation most suitable for the intended application, adding thereto at this stage an ester-forming compound having a functionality greater than two, and heating the resulting mixture until the said polymeric condensate and the said ester-forming compound have reacted. The final heating is preferably performed under an inert gas and/or under reduced pressure.

The mere admixture of a polyfunctional, stabilizing ester-forming agent to the linear condensation polyester fails to accomplish the objects of this invention. On the other hand, the optimum effects are not obtained from the polyfunctional, stabilizing ester-forming agent when it is mixed with a dihydric alcohol and a dibasic ester-forming carboxylic compound and all of these components then reacted. In general, the polymeric products thus obtained lack the properties and advantages inherent in the polymers prepared according to this invention.

For the preparation of the linear polyester, there may be used as dihydric alcohols any of the alkylene or polyalkylene glycols, including ethylene glycol, trimethylene glycol, propylene glycol, the various butylene glycols, hexylene glycol, octylene glycol, dodecylene glycol, diethylene glycol, triethylene glycol, tetraethylene glycol, or the like, cyclohexanediols, 1,2-di-β-hydroxyethyl benzene, di-β-hydroxyethoxy benzene, 2,2-(di-β-hydroxyethoxyphenyl) propane, xylylene glycols, thiotriethylene glycol, or other dihydric alcohol so long as it is free from groups other than hydroxyl reacting with carboxylic groups. Equivalent to the dihydric alcohols are the halides thereof, which, as is known, may be reacted with salts of dibasic acids to form linear condensation polymers. There may be used a single dihydric alcohol or a mixture of such alcohols and, likewise, a single dibasic carboxylic acid or a mixture of such acids. The only known limitation as to choice of the two main reactants lies in the fact that when the combined chain length of alcohol plus acid is five or six atoms, cycles tend to form rather than chain polymers.

The preferred class of dihydric alcohols includes those of the formula:

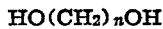

HO(CH₂)ₙOH wherein $n$ is an integer of at least two. These are the alkylene glycols, available with alkylene groups of two to twelve or more carbon atoms. The groups may be straight or branched chained.

As suitable dibasic acids, there may be used one or more of such acids as oxalic, succinic, glutaric, α-methyl glutaric, α-ethyl glutaric, adipic, β-methyl adipic, pimelic, suberic, azelaic, sebacic, brassilic, tetradecanedioic, paraphenylene diacetic, 2,2-di-carboxymethoxyphenyl propane, phthalic, terephthalic, hexahydroterephthalic, isophthalic, diglycolic, thiodibutyric, diphenic, or the like dicarboxylic acid. Individual acids or mixtures of acids may be used. Particularly in such mixtures, there may be used unsaturated aliphatic acids such as maleic, fumaric, or dihydromuconic. Instead of the acids themselves, there may be used with suitable change in the esterification process the corresponding anhydrides, where such exist, such as succinic, maleic, or sebacic anhydrides, or acid halides, such as succinyl chloride or adipyl bromide, salts such as potassium adipate, or esters of a volatile alcohol, such as ethyl pimelate or methyl sebacate. In general, any poly-ester forming derivative of a dibasic acid or the acid itself may be reacted with a dihydric alcohol or an ester-forming derivative thereof.

The preferred class of dibasic carboxylic acids may be represented by the formula:

HOOC(CH₂)ₘCOOH wherein $m$ is an integer having a value of at least two. The known acids coming within this formula are the saturated dibasic aliphatic carboxylic acids from succinic acid upwards. These dibasic acids may be used as pure entities or in mixtures of the various dibasic acids of this type. Mixtures of a preferred type of dibasic acid with other types of dibasic acids may also be used. Some of the most useful mixtures are with such acids as phthalic or maleic in which the latter constitute the minor proportion.

The primary reactions between dibasic acid or derivative and dihydric alcohol or derivative are known, and the formation of linear condensation polymers therefrom has already been given considerable study. Usually, when excess of acid is used, the terminal groups of the polymers are primarily carboxylic while, when excess of glycol is used, the terminal groups are primarily hydroxyl. When polymers of rather high molecular weights, let us say above three thousand to five thousand, are desired, it is usually desirable to start with an excess of the more volatile constituent, which excess may be removed at an advanced stage of polymerization by a method such as heating with distillation of the excess constituent under reduced pressure. When an excess of glycol is used, the terminal groups of the polymeric chains are primarily hydroxyl groups, as has been indicated. In promoting the degree of polymerization or in increasing the molecular weight of the linear condensates, continued heating is generally resorted to, preferably under reduced pressure to assist in the removal of the water, alcohol, hydrogen halide, or the like, when these are formed in the condensation. A volatile product formed may similarly be removed by passage of a gas, particularly one such as hydrogen or nitrogen, which is inert. Condensation by heating is continued until the type of polymer desired is almost reached. The degree of condensation or polymerization at this point will vary considerably, depending on the properties desired in the final condensates and the choice of difunctional reactants and the presence or absence of a catalyst.

As catalysts there have been proposed acidic substances, such as toluene sulfonic acid and zinc chloride. These greatly accelerate the formation of high polymers, but they also lessen the stability of polymers formed therewith.

The condensation may be carried to different degrees of polymerization to attain certain properties. For example, if waxy or crystalline polymer is desired, the degree of polymerization may be lower, other things being equal, than when tough, flexible polymers are desired. If polymers which can be drawn into fibers or films are required, then relatively high molecular weights are preferably attained before stabilization is accomplished.

The condensate brought to approximately the desired degree of polymerization, as shown by a test such as that for intrinsic viscosity or melt viscosity, is treated with a stabilizing agent consisting of an ester-forming compound having an ester-forming functionality greater than two. Trifunctional ester-forming compounds are preferred as stabilizers. Such polyfunctional ester-forming compounds include their derivatives which yield these compounds in reaction, inasmuch as they react in the system to produce the same effect. The polyfunctional stabilizing compounds include tricarboxylic acids, tetracarboxylic acids, and higher carboxylic acids, their esters, anhydrides, acyl halides, acid amides, and salts, including their amine salts. The polyfunctional stabilizing compounds also include trihydric, tetrahydric, and higher polyhydric alcohols.

These compounds include among the polyfunctional acids and derivatives tricarballylic acid, citric acid, cyclic delta ketonic tetracarboxylic acids, such as are shown in United States Patent No. 2,329,432, issued September 14, 1943, benzene pentacarboxylic acid, and mellitic acid, methyl, ethyl, or phenyl esters of such acids, trimethyl amine salts thereof, the simple amides, phosphite esters, such as the aryl phosphites, alkyl phosphites, cycloalkyl phosphites, or aralkyl phosphites, examples of which are tricresyl phosphite, triphenyl phosphite, dibutylphenyl phosphite, phenyl ethyl phosphite, trimethyl phosphite, triethyl phosphite, trioctyl phosphite, diamyl phosphite, monoamyl phosphite, diphenoxyethyl phosphite, dicyclohexyl, and the corresponding thiophosphites, phosphate esters, examples of which are tricresyl phosphate, triethyl phosphate, triphenyl phosphate, triamyl phosphate, diphenyl ethyl phosphate, diphenyl phosphate, tri-$\beta$-butoxyethyl phosphate, and the like, triethyl borate, triamyl borate, tricapryl borate, arsenites, such as triethyl arsenite, triphenyl arsenite, etc. There may likewise be used phosphorus trichloride, phosphoric anhydride, phosphoric oxychloride, arsenic trioxide, etc.

Among the polyfunctional alcohols are glycerol, pentaerythrite, trimethylol propane-1,1,1, erythritol, sorbitol, mannitol, inositol, diglycerol, polyglycerol, and the like, or derivatives, including esters of volatile acids, such as triacetin, sorbitol hexabenzoate, or pentaerythritol diacetate.

In general, it is preferable to use such an alcohol with a functionality of three or more when the terminal groups are primarily carboxylic. On the other hand, when the terminal groups are primarily hydroxyl, it is preferred that the stabilizing agent used be an acid or derivative thereof. At the same time, it should be pointed out that stabilizing action is not confined to the preferred conditions just recited. Thus, even with terminal hydroxyl groups, there may be used polyhydric alcohols. By way of illustration, pentaerythrite has a definite stabilizing influence, although not as great, perhaps, as that obtained from triamyl phosphite or phosphorous acid.

The amount of ester-forming compound having a functionality of at least three which is reacted with the linear condensate is small, 0.0015 to 0.075 gram mol of said ester-forming compound per kilogram of theoretical polymer being not only sufficient but also within such limits that excessive and undesirable changes in the nature of the final polymer do not develop. It is preferred that concentrations of 0.003 to 0.04 mol be used as in most cases with consideration of both reactants and particular stabilizer, an optimum stability effect is obtained. In fact, in this preferred range of concentration, the resulting stabilized polymers are often markedly superior in various physical properties to compositions prepared without the use of the polyfunctional stabilizing agents of this invention.

As has been stated above, the stabilizing reagent is added at an intermediate stage of condensation. Thus, this reagent is not added until the linear condensation has been promoted to an extent approaching that giving the properties desired for a given application. Extremely early addition of stabilizing amounts of an ester-forming compound having a functionality of at least three is generally unfavorable to the continuation of linear condensation. On the other hand, the stabilizing compound cannot be merely mechanically mixed with, but not reacted with, linear polymers when a desired degree of condensation has been produced. There must be an opportunity for the added polyfunctional ester-forming material to react with terminal groups of the already formed condensate. Of course, in causing reaction of the stabilizing agent with the condensate, some additional linear condensation will occur. This can be allowed for in the reaction schedule. When polymers of low or only moderate molecular weight are desired, the condensation before addition of stabilizing agent should be carried more nearly to the desired state than in the case of higher polymers. Specifically, in the case of phosphites as stabilizing agents and in the case of condensates having intrinsic viscosities below about 0.7, the condensation may desirably be carried close to the desired state of polymerization before addition of stabilizing agent, as subsequent condensation takes place but slowly. Above 0.7, however, considerably more latitude exists when phosphites are used as stabilizers and linear condensation may be safely carried on to the desired state at the same time that the stabilizing agent is being reacted. All in all, the exact time of addition of stabilizing agent is not critical. With due regard to the presence of catalysts, temperatures of reaction, and other conditions which bring about the formation of linear polyesters, it may be said that the addition of stabilizing agent may be made from about one and one-half to three hours before completion of the condensation reaction and the reaction continued at a temperature sufficient to ensure reaction of the stabilizing agent with the already formed polymer. When an acid chloride or a compound such as phosphorus trichloride is used, temperatures of 80° to 150° C. are sufficient. With less reactive agents, such as pentaerythritol or triphenyl phosphate, temperatures of 180° to 300° C. are generally required.

Stabilization according to this invention becomes of increasing importance as the chain length of the polymer increases. As might be expected, lower polymers degrade to a smaller extent and usually less rapidly than the higher polymers. The stabilization of polymers having intrinsic viscosities above about 0.5 is of particular importance, for such polymers have considerable tendency to degrade in air, light, or moisture, particularly when the polymers are acid catalyzed.

The stability of polymeric products prepared according to this invention may be appraised by an accelerated test such as the following. A sample of the polymer is placed in a dish in an oven at 125° C. for sixteen hours. Solutions are then made of the heated sample and of the original material. Viscosities of each are determined. From the change in viscosities of the solutions at the same concentration or from the change in the values of intrinsic viscosities, the degree of stabilization may be evaluated. Comparison may be made with condensates of about the same original intrinsic viscosity but which have not been reacted with a stabilizing amount of an ester-forming compound having a functionality above two.

The results of such an accelerated test have been compared with results obtained by natural aging over a period of nineteen months, and the results by the two methods were found to agree. For example, a polymeric ethylene sebacate having an initial intrinsic viscosity of 1.006 was stored in a cabinet for nineteen months at room temperature. At the end of the time, its intrinsic viscosity was again determined and found to be 0.798, representing a loss of 0.208 unit. The loss in toughness and flexibility was approximately proportional to the loss in intrinsic viscosity.

A similar sample of ethylene sebacate stabilized according to this invention had an initial intrinsic viscosity of 0.848. It was stored in the same cabinet for the same length of time as the unstabilized sample above. At the end of this time, the intrinsic viscosity was 0.809, representing a loss of only 0.039 unit.

A similar preparation stabilized according to this invention with 0.2% of tricapryl phosphite based on the weight of polymer had an initial intrinsic viscosity of 0.841. After being heated at 125° C. for fifteen hours, it had an intrinsic viscosity of 0.818, representing a loss of 0.023 unit, a value of the same order as that obtained above with natural aging for nineteen months.

Further details of this invention are presented in the following illustrative examples:

Example 1

A molecular proportion of sebacic acid was mixed with ethylene glycol in an amount greater than equivalent to the acid. The mixture was heated at 190°–200° C. for approximately three and a half hours. During this time, glycol was refluxed from a condenser maintained at about 100° C. to facilitate the removal of water. The condenser was then removed, and the reaction mixture was heated under greatly reduced pressure with the temperature being gradually raised to about 265° C. The mixture was held at this temperature under 10 mm. mercury pressure until the desired degree of polymerization was reached (approximately twenty hours). The resulting polymer had an intrinsic viscosity of 0.9 as calculated by the formula:

$$\text{Intrinsic viscosity}^1 = \frac{\text{viscosity ratio} - 1}{\text{concentration}}$$

wherein the viscosity ratio is the viscosity of the solution of polymer divided by the viscosity of the solvent (both at 25° C.).

When this polymer was heated for sixteen hours at 125° C., it changed in intrinsic viscosity from 0.9 to 0.8.

The preparation of polymer was repeated under as nearly identical conditions as possible except that when the intrinsic viscosity approached a value of 0.8, 0.0015 mol of triphenyl phosphite per mol of sebacic acid was added thereto and the reaction continued until the intrinsic viscosity reached about 0.9.

A sample of this polymer was also heated for sixteen hours at 125° C. It changed in intrinsic viscosity only about 0.01 unit. Both the stabilized and unstabilized samples, before heating, were very tough and flexible, but these properties were retained only by the stabilized sample. The stabilized polymer was suitable for extrusion coating on wire.

Example 2

A molecular proportion of sebacic acid was mixed with about two molecular proportions of ethylene glycol and a trace of zinc chloride, and the mixture heated under reflux until water was no longer freely evolved. The reaction mixture was then heated under 10 to 20 mm. mercury pressure and the excess glycol distilled off. The condensate thus formed was heated under low pressure at 200°–275° C. until an intrinsic viscosity of 0.940 was reached. A sample of this product heated in air at 125° C. for sixteen hours changed in intrinsic viscosity to 0.736.

The above reaction was repeated, except that as the intrinsic viscosity rose above 0.7 there was added to the reaction mixture 0.0015 mol of triphenyl phosphite. The reaction was continued under reduced pressure until the intrinsic viscosity reached a value of 0.957. A sample of this polymer heated for sixteen hours at 125° C. dropped to 0.944.

Another preparation carried to an intrinsic viscosity of 0.764, after treatment with 0.0066 gram mol of triphenyl phosphite per kilogram of polymer, changed to 0.758 after being heated for sixteen hours at 125° C.

Example 3

The procedure of Example 2 was repeated except that tricapryl phosphite in an amount of 0.27% (based on the resulting polyester), or 0.0015 mol, or 0.0066 gram mol per kilogram of polymer, was used in place of the triphenyl phosphite. The intrinsic viscosity was 0.841. After a sample was heated for sixteen hours at 125° C., the intrinsic viscosity thereof was 0.818.

Example 4

When 0.0015 mol of tri-diisobutylphenyl phosphite, the diisobutylphenyl group having the composition tert.-$C_8H_{17}C_6H_4$, was used as the stabilizing agent according to the procedure of Examples 2 and 3, a polymer having an intrinsic viscosity of 0.90 was obtained. When a sample of this was heated overnight at 125° C., the value fell to 0.88. This polymer was used for laminating cloth.

Example 5

The procedure of the preceding examples was followed with triphenylethyl phosphite at 0.25% (based on the polyester) or 0.0066 gram mol per kilogram of polymer as the stabilizing agent. The loss in intrinsic viscosity was 0.02 unit during the accelerated stability test.

Example 6

The procedure of the preceding examples was followed with tri-(diisobutylphenoxyethyl) phosphite as the stabilizing agent, 0.0015 mol being used. A change of intrinsic viscosity from 0.725 to 0.707 was found in the accelerated stability test.

Example 7

Phosphorous acid in an amount of 0.05% (0.0015 mol) was used as a stabilizer. A polymer having an intrinsic viscosity of 0.634 dropped 0.016 unit, and one having an intrinsic viscosity of 0.809 dropped 0.027 unit when heated in the test for stability.

Example 8

Phosphorus trichloride was used as a stabilizer. Because of its volatility, 0.0033 mol was used per mol of sebacic acid. While considerable of this material was lost, the polymer obtained had excellent stability. The intrinsic viscosity fell from 0.797 to 0.744 during a standard stability test.

In all of the above examples, the polymers which had been treated with stabilizing agents retained their desirable properties when heated

---

[1] This is a useful and convenient formula, approximating in results the values obtained by the formula, intrinsic viscosity=log_e ratio/concentration. Concentration is in grams per 100 cc. of solvent.

in air and in light. The stabilized polymers remained flexible and tough, whereas samples which had not been reacted with stabilizing agents became hard and brittle. It was further noted that some stabilized samples retained their color much better than unstabilized polymers.

It was noted that when an unstabilized polymer and a stabilized polymer gave the same values for intrinsic viscosity at 0.4 gram per 100 cc. of chloroform, the viscosities of solutions in other solvents might vary. Thus, at a concentration of 20% in ethylene dichloride, the viscosities of the solutions of unstabilized polymers were generally greater than the viscosities of similar solutions of stabilized polymers having the same intrinsic viscosities. The viscosities of melted stabilized polymers tended to be but little more than those of comparable unstabilized polymers.

Viscosity degradation resulting from hydrolysis was also observed for samples of stabilized and unstabilized polyesters prepared as above. Pieces 2 x 2 x 0.7 cm. were submerged in water and kept for ten days at 60° C. Intrinsic viscosities were then determined. A sebacic acid-glycol polymer, catalyzed with zinc chloride, gave a value of 0.908 before submersion and 0.702 after, and had lost its toughness. A similar sample which had been stabilized with 0.003 gram mol of triphenyl phosphite per kilogram of polymer changed from 0.842 to 0.785 without any serious change in other properties. Another polyester stabilized with 0.2% of the same phosphite changed from 0.848 to 0.798 in intrinsic viscosity.

By procedures similar to those described above linear polymers were prepared in variety and stabilized with ester-forming compounds having a functionality of at least three. Definite stabilization was evident when about 0.001 or more gram mols of such ester-forming compound was used per kilogram of polymer. With amounts of 0.0015 mol up to 0.075 mol, adequate stabilization was obtained. Above the latter concentration, however, excessive gelation usually occurred, and the resulting polymers developed undesirable properties, such as extremely high melt viscosities. In some cases at concentrations above 0.075 gram mol per kilogram of theoretical polymer actual impairment of stability was noted.

*Example 9*

(a) One molecular proportion of sebacic acid and an excess of propylene glycol were mixed and heated. Water was taken off and finally excess propylene glycol was removed under reduced pressure. About 0.1% of zinc chloride was added as a catalyst and the polymerization continued until an intrinsic viscosity of 0.777 was reached. The intrinsic viscosity fell to 0.631, when the polymer was heated for sixteen hours at 125° C. in air.

(b) The preparation of polymeric propylene sebacate was repeated with the change that when the intrinsic viscosity reached about 0.7, 0.007 gram mol of tricresyl phosphite per kilogram of polymer was introduced and the reaction continued under an atmosphere of nitrogen until an intrinsic viscosity of 0.768 was reached. When a sample of this polymer was heated for sixteen hours at 125° C., the value for intrinsic viscosity fell only 0.014 unit.

This product was compounded with butadiene-acrylonitrile synthetic rubber and found to impart remarkable flexibility at low temperatures with no undesirable decrease in tensile strength or oil resistance.

*Example 10*

(a) A molecular proportion of succinic acid and an excess of ethylene glycol over the theoretical requirement were mixed and heated together. A trace of zinc chloride was added. Water was removed along with glycol. Finally, excess glycol was removed by heating under reduced pressure. The reaction temperature was carried up to about 225° C. while hydrogen was bubbled through the reaction mixture. The resulting polymer had an intrinsic viscosity of 0.522, which fell to 0.454 after the accelerated stability test in air.

(b) The above preparation was repeated except that, at about an intrinsic viscosity of 0.5, there was introduced 0.0066 gram mol of triphenyl phosphite per kilogram of polymer and the heating continued while hydrogen was bubbled through the reaction mixture. A polymer of an intrinsic viscosity of 0.590 resulted, which fell to 0.574 after the accelerated stability test in air. This product was hard but tough and well suited for laminating sheets of material, such as wood veneers.

*Example 11*

A molecular proportion of azelaic acid was heated with a large excess of dimethyl trimethylene glycol under reflux conditions. Zinc chloride was added in a catalytic amount, and the heating was continued under reduced pressure. The glycol was removed and the polymer heated until an intrinsic viscosity of about 0.7 was reached. Tricresyl phosphate (0.075 gram mol per kilogram of polymer) was added and the reaction continued under reduced pressure to an intrinsic viscosity of 0.9. The intrinsic viscosity became 0.85 after the product was heated in air for eighteen hours at 125° C.

*Example 12*

The procedure of Example 2 was followed except that 0.0066 gram mol of triphenyl phosphate per kilogram of polymer was used in place of the phosphite. The intrinsic viscosity of the polymer was 0.795. After this polymer was heated at 125° C. for eighteen hours, the intrinsic viscosity was 0.773.

*Example 13*

The procedure of Examples 2 and 12 was followed except that o-phosphoric acid in an amount of 0.0075 mol per mol of acid was used as the stabilizing agent. The reaction was stopped when the intrinsic viscosity reached 0.798. A sample of this polymeric material heated for sixteen hours at 125° C. in air gave an intrinsic viscosity of 0.668.

A preparation from the same materials was made parallel to the above stabilized preparation, but no stabilizing agent was added. This material showed an intrinsic viscosity of 0.811, which dropped to 0.582 after the stability test.

*Example 14*

One molecular proportion of sebacic acid and 1/100 molecular proportion of maleic anhydride were mixed with a 20% molecular excess of a mixture of 80 parts of ethylene glycol and 20 parts of propylene glycol. The resulting mixture was heated under reflux conditions until water was no longer given off. The reaction mixture was then heated under reduced pressure and the excess alcohols removed. There was then added triphenyl phosphite in an amount of 0.0015 mol. Heating under vacuum was continued at 220° C. until an intrinsic viscosity of 1.10 was reached.

After a sample of this polymeric material was heated in the usual accelerated stability test, it was found to have an intrinsic viscosity of 0.953.

A parallel preparation was made, but without the use of a stabilizer. The polymerization was carried on until an intrinsic viscosity of 1.10 was reached. When a sample of this product was heated in the accelerated stability test, it gelled and became completely insoluble.

By reacting an ester-forming compound having a functionality of three or more with a long-chained polyester from a dibasic acid and a dihydric alcohol, there is obtained a new composition which retains essentially all the useful properties of long-chained linear polyesters and which is resistant to changes resulting from aging, air, moisture, or light. The new polymeric compositions possess a utility far beyond that of similar unstabilized polyesters and may be used in applications such as coating, laminating, extruding, and the like, for which comparable compositions known heretofore have been of less or even doubtful utility. They may also be used under conditions which preclude the use of previously known polyesters.

The phosphites have been found to possess a stabilizing action which is particularly valuable. At the same time, they have value as anti-oxidants. If desired, other anti-oxidants may be added to the polymeric compositions of this invention in addition to a polyfunctional stabilizing agent.

We claim:

1. In the stabilization against degradation in molecular weight of a polyester consisting of chains from a saturated dihydric alcohol with a carbon chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, the steps which comprise reacting by condensing together under the influence of heat said alcohol and said acids with the saturated acid in molecular excess of the unsaturated acid until polyesterification has taken place, then reacting under the influence of heat as the sole reactants the resulting polyester and from 0.0015 to 0.075 gram mole per kilogram of said polyester of a phosphorus compound from the group consisting of alkyl phosphite esters in which the alkyl group has one to eight carbon atoms and phenyl and alkylphenyl phosphite esters wherein the alkyl substituent is joined to the phenyl group and contains one to eight carbon atoms.

2. In the stabilization against degradation in molecular weight of a polyester consisting of chains from a saturated dihydric alcohol with a carbon chain of two to twelve carbon atoms and alcoholic hydroxyl groups as the sole reactive functional groups thereof, chains from a saturated dicarboxylic acid with a chain of four to fourteen carbon atoms and with carboxyl groups as their sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, the steps which comprise reacting by condensing together under the influence of heat said alcohol and said acids with the saturated acid in molecular excess of the unsaturated acid until polyesterification has taken place, then reacting under the influence of heat as the sole reactants the resulting polyester and from 0.003 to 0.04 gram mole per kilogram of said polyester of a phosphorus compound from the group consisting of alkyl phosphite esters in which the alkyl group has one to eight carbon atoms and phenyl and alkylphenyl phosphite esters wherein the alkyl substituent is joined to the phenyl group and contains one to eight carbon atoms.

3. In the stabilization against degradation in molecular weight of a polyester consisting of chains from a saturated dihydric alcohol with a carbon chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, the steps which comprise reacting by condensing together under the influence of heat said alcohol and said acids with the saturated acid in molecular excess of the unsaturated acid until polyesterification has taken place, then reacting under the influence of heat as the sole reactants the resulting polyester and from 0.0015 to 0.075 gram mole per kilogram of said polyester of an alkylphenyl phosphite ester wherein the alkyl group is joined to the phenyl ring and contains one to eight carbon atoms.

4. In the stabilization against degradation in molecular weight of a polyester consisting of chains from a saturated dihydric alcohol with a carbon chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, the steps which comprise reacting by condensing together under the influence of heat said alcohol and said acids with the saturated acid in molecular excess of the unsaturated acid until polyesterification has taken place, then reacting under the influence of heat as the sole reactants the resulting polyester and from 0.0015 to 0.075 gram mole per kilogram of said polyester of an alkyl phosphite ester wherein the alkyl group contains one to eight carbon atoms.

5. In the stabilization against degradation in molecular weight of a polyester consisting of chains from a saturated dihydric alcohol with a carbon chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, the steps which comprise reacting by condensing together under the influence of heat said alcohol and said acids with the saturated acid in molecular excess of the unsaturated acid until polyesterification has taken place, then reacting under the influence of heat as the sole reactants the resulting polyester and from 0.0015 to 0.075 gram mole per kilogram of said polyester of triphenyl phosphite.

6. In the stabilization against degradation in molecular weight of a polyester consisting of chains from a saturated dihydric alcohol with a carbon chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, the steps which comprise reacting by condensing together under the influence of heat said alcohol and said acids with the saturated acid in molecular excess of the unsaturated acid until polyesterification has taken place, then reacting under the influence of heat as the sole reactants the resulting polyester and from 0.0015 to 0.075 gram mole per kilogram of said polyester of tricresyl phosphite.

7. In the stabilization against degradation in molecular weight of a polyester consisting of chains from a saturated dihydric alcohol having a chain of two to twelve carbon atoms and having alcoholic hydroxyl groups as the sole reactive functional groups and chains from sebacic acid and maleic acid, the number of chains from the sebacic acid being greater than the number of chains from the maleic acid, the steps which comprise reacting by condensing together under the influence of heat said alcohol and said acids with the saturated acid in molecular excess of the unsaturated acid until polyesterification has taken place, then reacting under the influence of heat as the sole reactants the resulting polyester and from 0.0015 to 0.075 gram mole per kilogram of said polyester of a phosphorus compound from the group consisting of alkyl phosphite esters in which the alkyl group has one to eight carbon atoms and phenyl and alkylphenyl phosphite esters wherein the alkyl substituent is joined to the phenyl group and contains one to eight carbon atoms.

8. The stabilized polyester resulting from the procedural steps of claim 7.

9. A process of stabilizing against marked changes in molecular weight polyesters consisting of chains from a saturated dihydric alcohol with a chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, which comprises reacting by condensing under the influence of heat said acids with the saturated acid in molecular excess of the unsaturated acid and said alcohol in molecular excess of the acids to form a polyester, continuing the condensation with removal of excess alcohol until a polyester of a molecular size from 3000 to 12,000 is obtained, adding to the polyester at a time one and a half to three hours before said molecular size is reached and reacting therewith 0.0015 to 0.075 gram mole per kilogram of the polyester of a phosphorus compound from the group consisting of alkyl phosphite esters in which the alkyl group has one to eight carbon atoms and phenyl and alkyl phenyl phosphite esters wherein the alkyl substituent is joined to the phenyl group and contains one to eight carbon atoms.

10. A process of stabilizing against marked changes in molecular weight polyesters consisting of chains from a saturated dihydric alcohol with a chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, which comprises reacting by condensing under the influence of heat said acids with the saturated acid in molecular excess of the unsaturated acid and said alcohol in molecular excess of the acids to form a polyester, continuing the condensation with removal of excess alcohol until a polyester of a molecular size from 3000 to 12,000 is obtained, adding to the polyester at a time one and a half to three hours before said molecular size is reached and reacting therewith 0.0015 to 0.075 gram mole per kilogram of the polyester of an alykyl phosphite wherein the alkyl group contains one to eight carbon atoms.

11. A process of stabilizing against marked changes in molecular weight polyesters consisting of chains from a saturated dihydric alcohol with a chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, which comprises reacting by condensing under the influence of heat said acids with the saturated acid in molecular excess of the unsaturated acid and said alcohol in molecular excess of the acids to form a polyester, continuing the condensation with removal of excess alcohol until a polyester of a molecular size from 3000 to 12,000 is obtained, adding to the polyester at a time one and a half to three hours before said molecular size is reached and reacting therewith 0.0015 to 0.075 gram mole per kilogram of the polyester of triphenyl phosphite.

12. A process of stabilizing against marked changes in molecular weight polyesters consisting of chains from a saturated dihydric alcohol with a chain of two to twelve carbon atoms and alcoholic hydroxyl groups as the sole reactive functional groups thereof, chains from a saturated dicarboxylic acid with a chain of four to fourteen carbon atoms and with carboxyl groups as the sole reactive functional groups thereof, and chains from an olefinically unsaturated aliphatic dicarboxylic acid with a chain of four to six carbon atoms and with carboxyl groups and an olefinic linkage as the sole functional groups thereof, the number of chains from said unsaturated acid being less than the number of chains from said saturated acid, which comprises reacting by condensing under the influence of heat said acids with the saturated acid in molecular excess of the unsaturated acid and said alcohol in molecular excess of the acids to form a polyester, continuing the condensation with removal of excess alcohol until a polyester of a molecular size from 3000 to 12,000 is obtained, adding to the polyester at a time one and a half to three hours before said molecular size is reached and reacting therewith 0.0015 to 0.075 gram mole per kilogram of the polyester of tricresyl phosphite.

13. The stabilized polyester resulting from the procedural steps of claim 1.

14. The stabilized polyester resulting from the process of claim 9.

DAVID A. ROTHROCK, Jr.
RICHARD F. CONYNE.

REFERENCES CITED

The following references are of record in the file of this patent:

UNITED STATES PATENTS

| Number | Name | Date |
|---|---|---|
| 1,970,510 | Ellis | Aug. 14, 1934 |
| 2,153,511 | Cheetham et al. | Apr. 4, 1939 |
| 2,249,950 | Fuller | July 22, 1941 |
| 2,322,756 | Wallder | June 29, 1943 |

FOREIGN PATENTS

| Number | Country | Date |
|---|---|---|
| 540,168 | Great Britain | Oct. 8, 1941 |